(12) United States Patent
Berthold et al.

(10) Patent No.: US 7,174,096 B2
(45) Date of Patent: Feb. 6, 2007

(54) METHOD AND SYSTEM FOR PROVIDING PROTECTION IN AN OPTICAL COMMUNICATION NETWORK

(75) Inventors: Joseph Berthold, Linthicum, MD (US); Loudon Blair, Linthicum, MD (US); Roger Bakos, Linthicum, MD (US)

(73) Assignee: Ciena Corporation, Linthicum, MD (US)

( * ) Notice: Subject to any disclaimer, the term of this patent is extended or adjusted under 35 U.S.C. 154(b) by 739 days.

(21) Appl. No.: 10/625,595

(22) Filed: Jul. 24, 2003

(65) Prior Publication Data

US 2004/0114925 A1 Jun. 17, 2004

Related U.S. Application Data

(60) Provisional application No. 60/398,276, filed on Jul. 24, 2002.

(51) Int. Cl.
*H04B 10/00* (2006.01)
(52) U.S. Cl. ................... 398/5; 398/2; 398/1
(58) Field of Classification Search ............ 398/1–8
See application file for complete search history.

(56) References Cited

U.S. PATENT DOCUMENTS

| | | | | |
|---|---|---|---|---|
| 5,069,521 A | * | 12/1991 | Hardwick | 385/24 |
| 5,457,555 A | * | 10/1995 | Moriyama | 398/2 |
| 5,559,622 A | * | 9/1996 | Huber et al. | 398/5 |
| 5,712,847 A | * | 1/1998 | Hata | 370/228 |
| 5,731,887 A | * | 3/1998 | Fee | 398/5 |
| 5,777,761 A | * | 7/1998 | Fee | 398/7 |
| 5,790,286 A | * | 8/1998 | Bae | 398/5 |
| 6,057,948 A | * | 5/2000 | Mizrahi | 398/5 |
| 6,081,359 A | * | 6/2000 | Takehana et al. | 398/1 |
| 6,137,603 A | * | 10/2000 | Henmi | 398/4 |
| 6,198,721 B1 | * | 3/2001 | Mueller | 370/223 |
| 6,266,168 B1 | * | 7/2001 | Denkin et al. | 398/5 |
| 6,456,407 B1 | * | 9/2002 | Tammela et al. | 398/59 |
| 6,850,485 B2 | * | 2/2005 | Sakamoto et al. | 370/218 |
| 6,885,636 B1 | * | 4/2005 | Eve | 370/228 |
| 6,898,376 B1 | * | 5/2005 | Gerstel et al. | 398/5 |

* cited by examiner

*Primary Examiner*—Agustin Bello
(74) *Attorney, Agent, or Firm*—Clements Walker; Christopher L. Bernard; Tyler S. Brown

(57) ABSTRACT

A method and system for providing tandem protection in a communication system. Path protection is provided using at least two redundant communication paths and selecting the communication path having a higher signal quality. Interface protection is provided through a protection transceiver. The interface protection may be delayed while the path protection attempts to restore communication.

19 Claims, 8 Drawing Sheets

METHOD AND SYSTEM FOR PROVIDING PROTECTION IN AN OPTICAL COMMUNICATION NETWORK

CROSS REFERENCE TO RELATED APPLICATIONS

This application claims benefit of U.S. provisional application ser. No. 60/398,276 filed Jul. 24, 2002, the entire contents of which are incorporated herein by reference.

BACKGROUND OF THE INVENTION

1. Field of Invention

The invention relates generally to optical communication networks and in particular to methods and systems for providing protection in an optical communication network.

2. Description of Related Art

Communication networks often include protection mechanisms to reroute signals in the even of a service interruption. Primary causes of service interruption are link failures and networking equipment failures. Link failures may be caused by failure of the transmission medium, such as the cut of an optical fiber cable, or by failure of an active component that affects all the optical channels on a dense wavelength division multiplexed (DWDM) link, such as an optical amplifier. With carrier-class optical networking equipment, the most likely cause of equipment failure is failure of an isolated optical channel interface.

A variety of protection techniques exist in order to provide protection against service interruption. For example, a 1+1 protection scheme provides a redundant protection path for each working path. A switch at the receiving end of the working path can switch to receive the redundant signal on the protection path if signal quality is deteriorated on the working path. Another known protection scheme is 1:1 protection in which a protection path is associated with each working path, but the protection path is not utilized until signal quality is deteriorated on the working path. Another known protection scheme is 1:N protection in which a protection path is associated with multiple working paths. If signal deterioration is detected on one of the working paths, traffic is redirected to the protection path.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of embodiments of the invention refers to the accompanying drawings. The same reference numbers in different drawings identify the same or similar elements. Also, the following detailed description does not limit the invention. Instead, the scope of the invention is defined by the appended claims and equivalents thereof.

The invention may be used in a variety of communications networks, including electrical and optical networks, and combination electrical/optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connected" and "coupled" as used herein are relative terms and do not require a direct physical connection. This invention may be implemented over a physical linear, ring or mesh topology.

Figure 1:
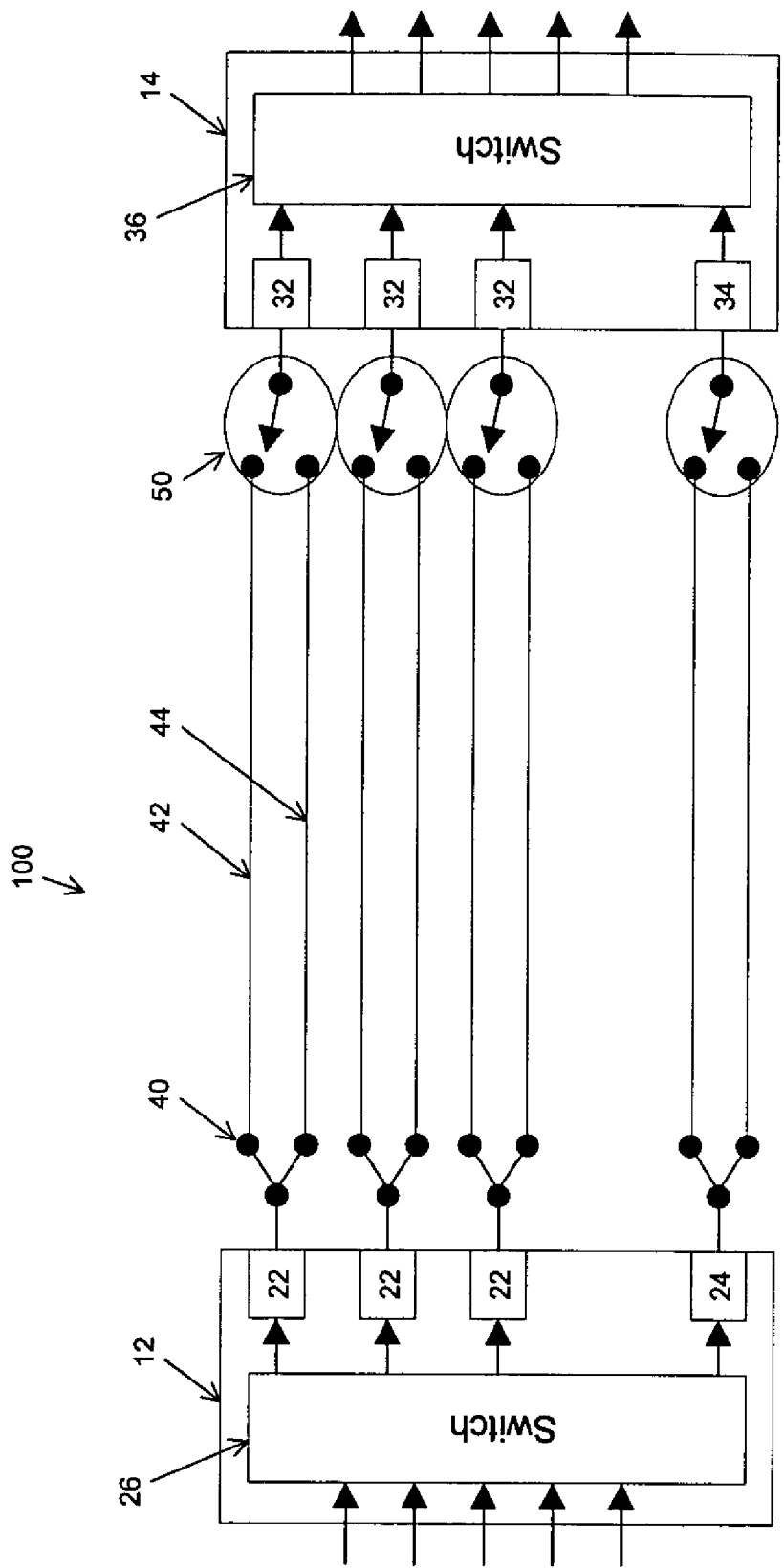
FIG. 1 is a block diagram of a communication network in an embodiment of the invention.

FIG. 1 is block diagram of a communication system 100 in an embodiment of the invention. The system 100 includes two network elements 12 and 14. The network elements may be any known network element such as a switch, router, etc. In one embodiment, network elements 12 and 14 may be a CoreDirector® switch available from CIENA Corporation.

Network element 12 includes a number of transceivers 22 and at least one protection transceiver 24. As described in further detail herein, the protection transceiver 24 provides 1:N optical interface protection for transceivers 22. SONET 1:N APS is an example of one type of 1:N optical interface protection. Additionally, it is understood that any number of protection transceivers (M) may be utilized to protect any number of transceivers (N). Thus, M:N optical interface protection may be provided. A switch 26 directs incoming traffic to an appropriate transceiver.

Similarly, the network element 14 includes transceivers 32, at least one protection transceiver 34 and a switch 36. For simplicity, communication is described as transmission from network element 12 and reception at network element 14. It understood that bi-directional communication may exist between the network elements.

At the output of transceivers 22 and protection transceiver 24 is a splitter 40 that divides the output into at least two diverse communication paths 42 and 44. For the purpose of this description, 2 diverse paths are shown but it is understood that more than two diverse communication paths may be used for higher redundancy. The diverse communication paths 42 and 44 represent separate communication paths between the network elements. These paths may be physically isolated such as separate optical fibers geographically separated to reduce the likelihood that both paths will be disrupted simultaneously.

At the receiver side at network element 14, an optical selector 50 monitors the signal on each communication path 42 and 44 and selects the diverse communication path having the better signal quality. The optical selector may be a simple, low cost device that monitors the first communication path 42 and switches to the second communication path 44 (or additional path, if available) in the event of a loss of signal (LOS) or loss of modulation (LOM), for example, on the first communication path 42. More complex techniques may be used to detect deterioration of signal quality as described herein. The redundant diverse communication paths 42 and 44 and the optical selector 50 provide optical path protection.

Optical interface protection is not constrained to using SONET 1:N protection. In the same way that SONET 1:N optical interface protection provides service survivability of the SONET signal, aggregated link interfaces on a router could provide survivable paths for IP packets.

Figure 2:
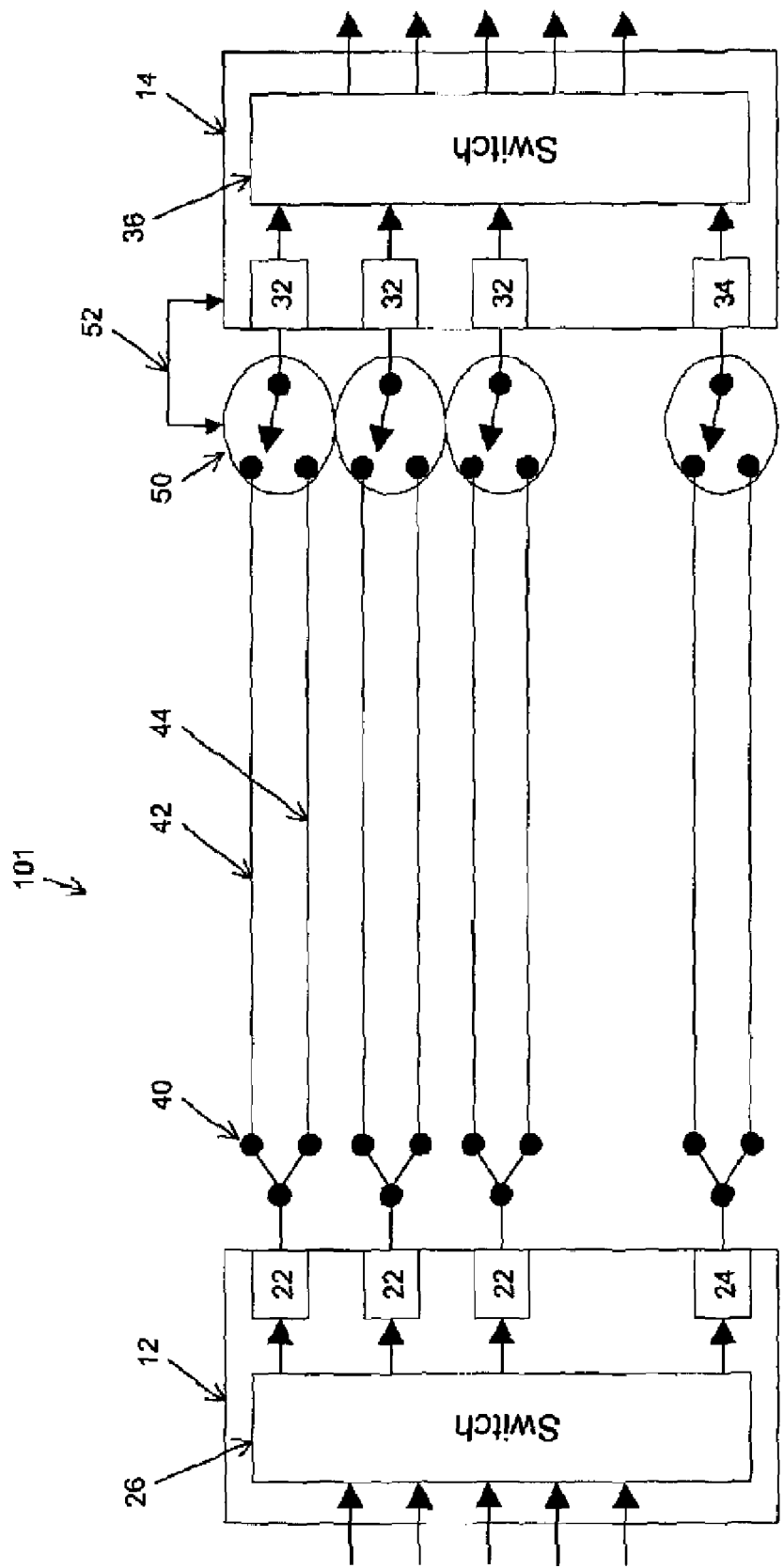
FIG. 2 is a block diagram of a communication network in an alternate embodiment of the invention having optical switch control feedback.

FIG. 2 is a block diagram of another communication system 101 in which the network element 14 provides a control signal 52 to optical selector 50 to cause the optical selector 50 to select a different communication path. The network element 14 may be able to detect more sophisticated signal deterioration than the optical selector 50 (e.g. using performance monitoring capabilities located on transceiver 32). This allows the optical selector to be a low cost device that monitors for simple signal deterioration (e.g. LOS). Network element 14 can detect signal quality such as bit error rate, eye pattern, signal-to-noise ratio, etc. If the network element 14 detects deteriorated signal quality, control signal 52 from network element 14 causes the optical selector 50 to select an alternate communication path.

Table 1 illustrates how selector 50 may be programmed to choose when to connect to diverse optical path 42 or 44.

If control signal 52 does not exist (or is not activated), then selector 50 will connect to the diverse optical path with better quality signal. Without control signal 52, if the quality of signal on each diverse optical path is the same, then the selector 50 will not change state.

If control signal 52 does exist, then network element 14 will send switch status instructions to selector 50. Selector 50 will follow those instructions if conditions at the detectors for optical path 42 and optical path 44 are normal. Under all other conditions, selector 50 will ignore said switch status instructions from network element 14 and perform as if control signal 52 does not exist.

TABLE 1

| Detector at Path 42 | Detector at Path 44 | Control Signal 52 | Selector 50 Action |
|---|---|---|---|
| Normal | Normal | None | No Change |
|  |  | Instruction from NE 14 | Follow NE 14 Instruction |
| Failure/ Degraded Signal | Failure/ Degraded Signal | None | No Change |
|  |  | Instruction from NE 14 | No Change Ignore NE 14 Instructions |
| Normal | Failure/ Degraded Signal | None | Connect to Path 42 |
|  |  | Instruction from NE 14 | Connect to Path 42 Ignore NE 14 Instructions |
| Failure/ Degraded Signal | Normal | None | Connect to Path 44 |
|  |  | Instruction from NE 14 | Connect to Path 44 Ignore NE 14 Instructions |

Figure 3:
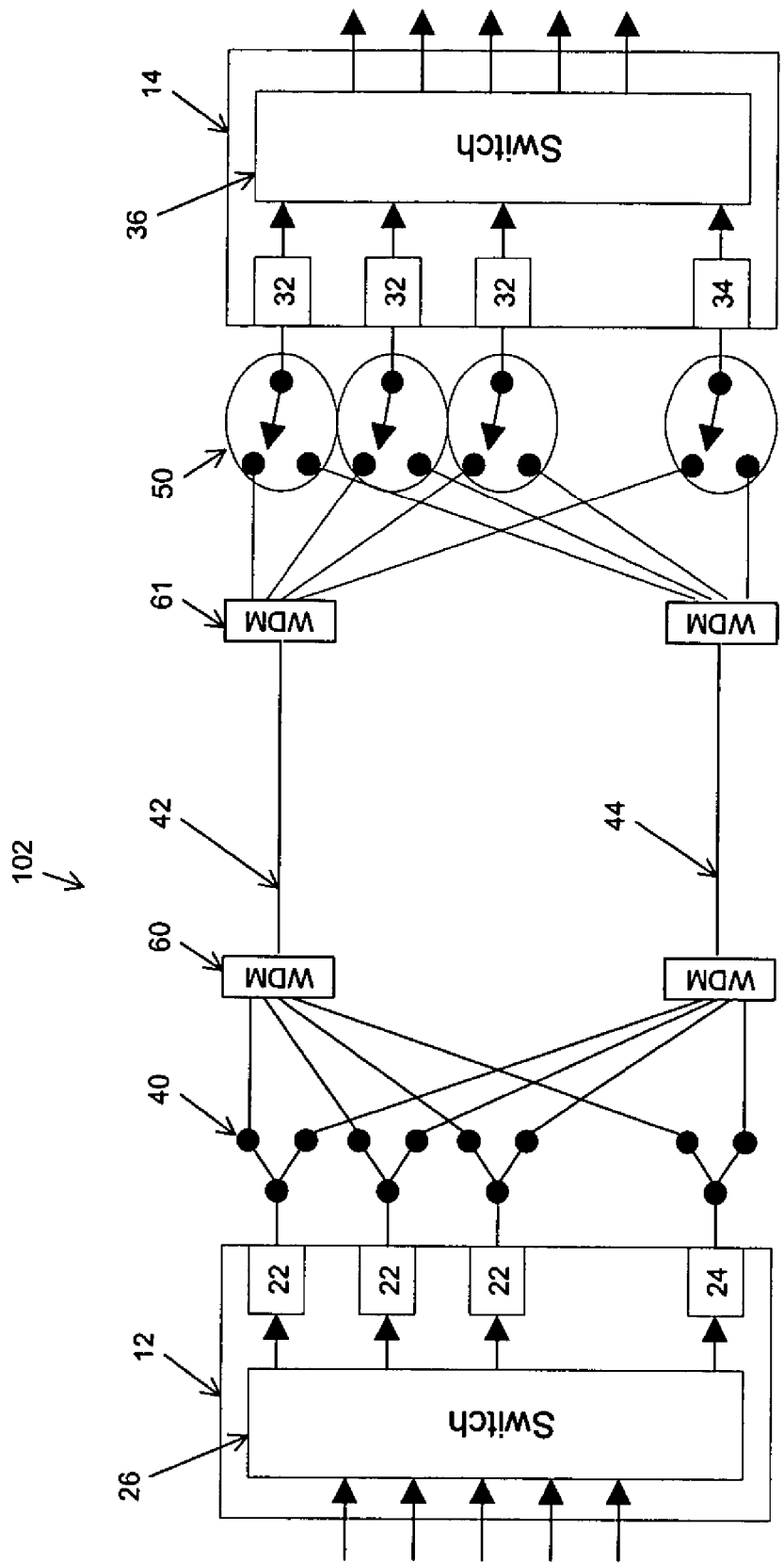
FIG. 3 is a block diagram of a communication network in an alternate embodiment of the invention having WDM transmission with multiple switches.

FIG. 3 shows an alternate communication system 102 in which the diverse communication paths are implemented using wavelength division multiplexing (WDM). The outputs of transceivers 22 and protection transceiver 24 are divided at splitters 40 and directed into diverse communication paths 42 and 44. At each diverse communication path, the outputs from the transceivers 22 and protection transceiver 24 are combined into a WDM signal by WDM equipment (not shown). Prior to arriving at the selectors 50, the WDM signal is demultiplexed. This provides for monitoring of each WDM channel. As discussed above, the selectors 50 direct the higher quality signal to network element 14.

Figure 4:
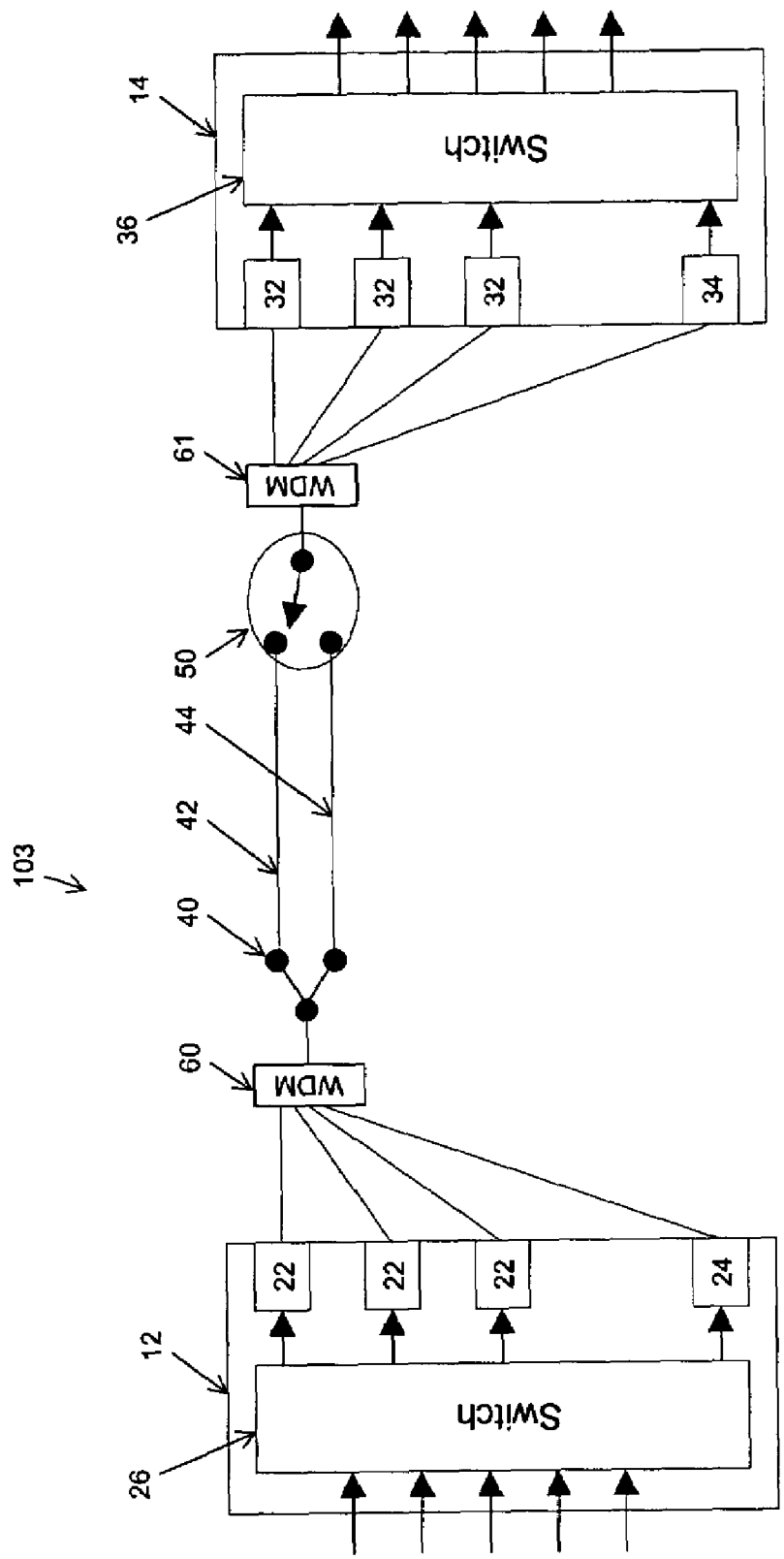
FIG. 4 is a block diagram of a communication network in an alternate embodiment of the invention having WDM transmission with a single switch.

FIG. 4 shows an alternate communication system 103 in which the diverse communication paths are implemented using wavelength division multiplexing (WDM). The outputs of transceivers 22 and protection transceiver 24 are combined into a WDM signal by WDM multiplexing equipment 60. At the output of the WDM multiplexing equipment 60, the combined multiplex of signals is divided at splitter 40 and directed into diverse communication paths 42 and 44. Prior to arriving at WDM demultiplexing equipment 61, the selector 50 chooses the best quality multiplex of signals. This provides for monitoring of many WDM channels simultaneously. The selector 50 directs the higher quality signals to WDM demultiplexing equipment 61. Each WDM signal is then passed to its appropriate transceiver 32 and protection transceiver 34 in network element 14.

Figure 5:
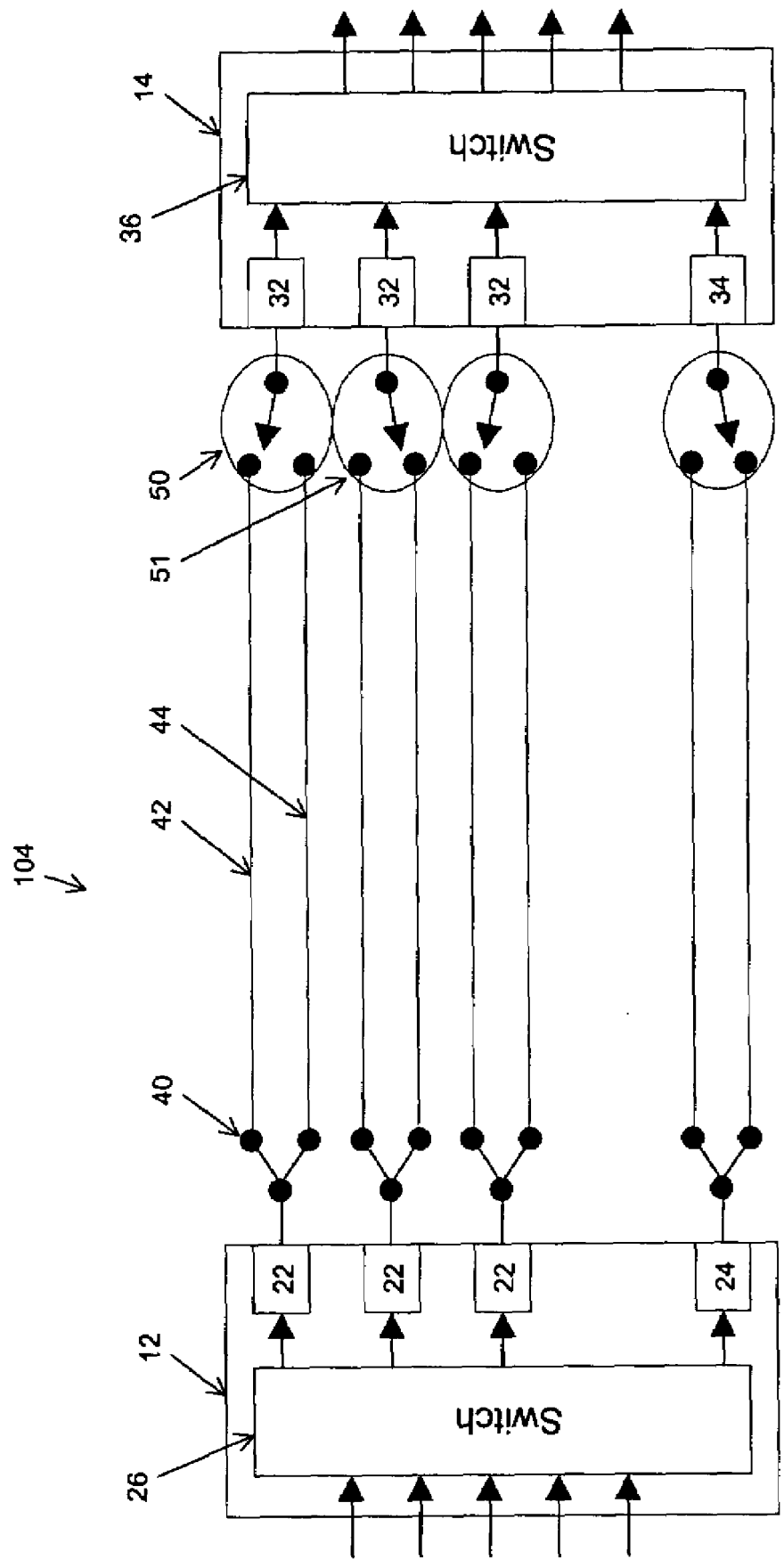
FIG. 5 is a block diagram of a communication network in an alternate embodiment of the invention having alternate channel routing.

FIG. 5 is a block diagram of another communication system 104 in which the selectors 50 and 51 are configured to receive optical signals from different diverse optical paths 42 and 44 respectively. This configuration provides network element 14 with information about the health of each diverse communication path 42 and 44 by receiving performance information from transceivers 32 and protection transceiver 34 (e.g. SONET PM) simultaneously.

Figure 6:
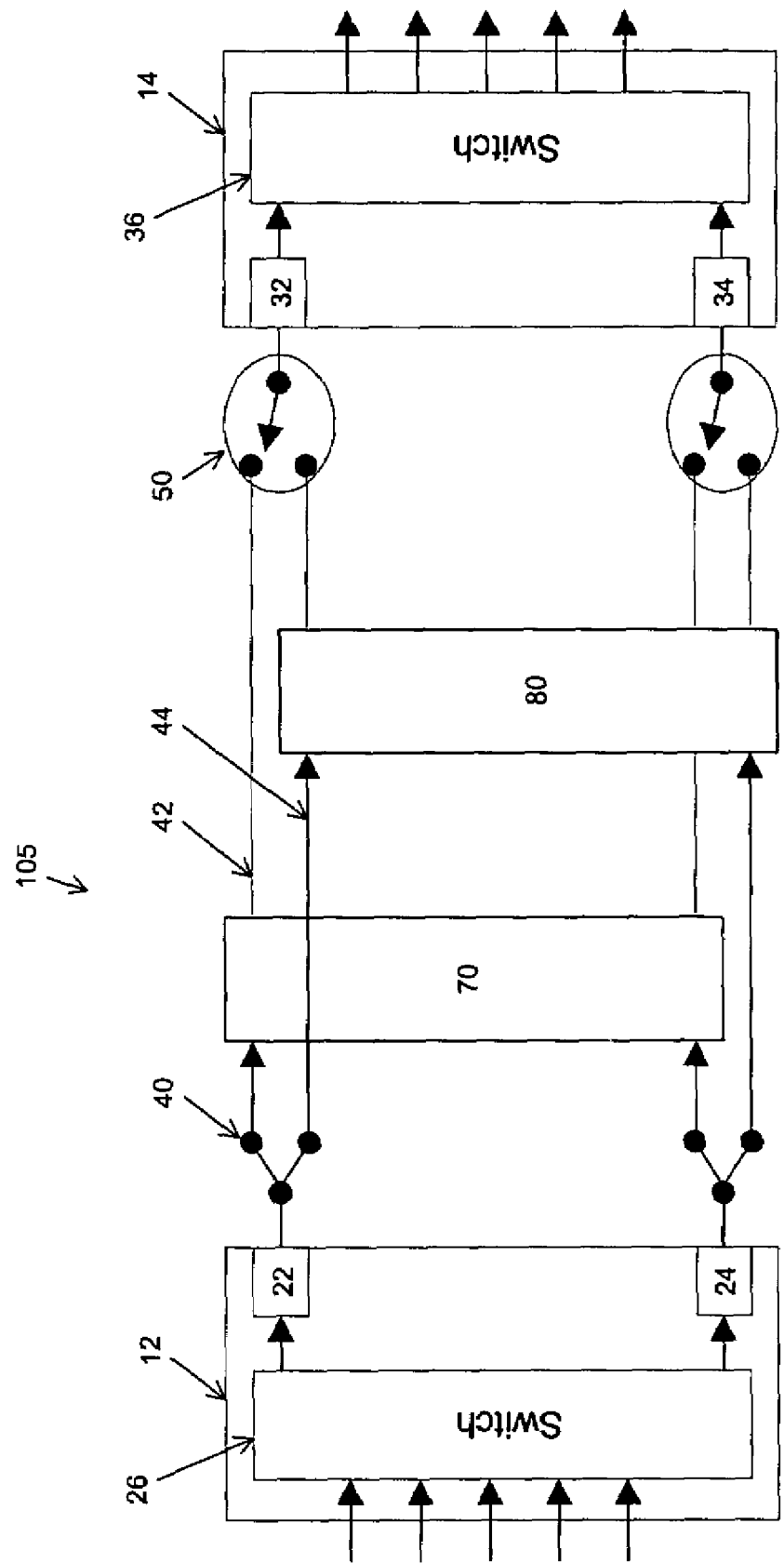
FIG. 6 is a block diagram of a communication network in an alternate embodiment of the invention having intermediate network elements between source and destination network elements.

FIG. 6 is a block diagram of a communication system 105 in another embodiment in which the tandem optical path protection and optical interface protection are provided over a communications network with intermediate network elements located between source and destination network elements.

For sake of illustration, this example describes optical path protection and optical interface protection for a signal transmitted from network element 12 to network element 14. During provisioning of communication paths, two diverse paths (42 and 44) are established between network element 12 and network element 14. The intermediate network element 70 is provisioned to pass signals along to network element 14 using diverse communication path 42 and intermediate network element 80 is provisioned to pass signals along to network element 14 using diverse communication path 44.

For the purpose of this example, network element 70 is defined to terminate the optical signal using an optical to optical (OO) interface. It receives the signal optically and re-transmits an optical signal towards network element 14 without electrical conversion. An example of such a network element may be an optical line amplifier (e.g. Erbium Doped Fiber Amplifier) or an all-optical switch. If WDM transmission is used then network element 70 may be an Optical Add Drop Multiplexer or a Wavelength Selective Optical Switch.

For the purpose of this example, network element 80 is defined to terminate the optical signal using an optical to electronic to optical (OEO) interface. It receives the signal optically, converts the optical signal to an electronic signal and re-transmits a regenerated optical signal towards network element 14. An example of such a network element may be a SONET regenerator (e.g. Section Terminating Equipment or Line Terminating Equipment).

Figure 7:
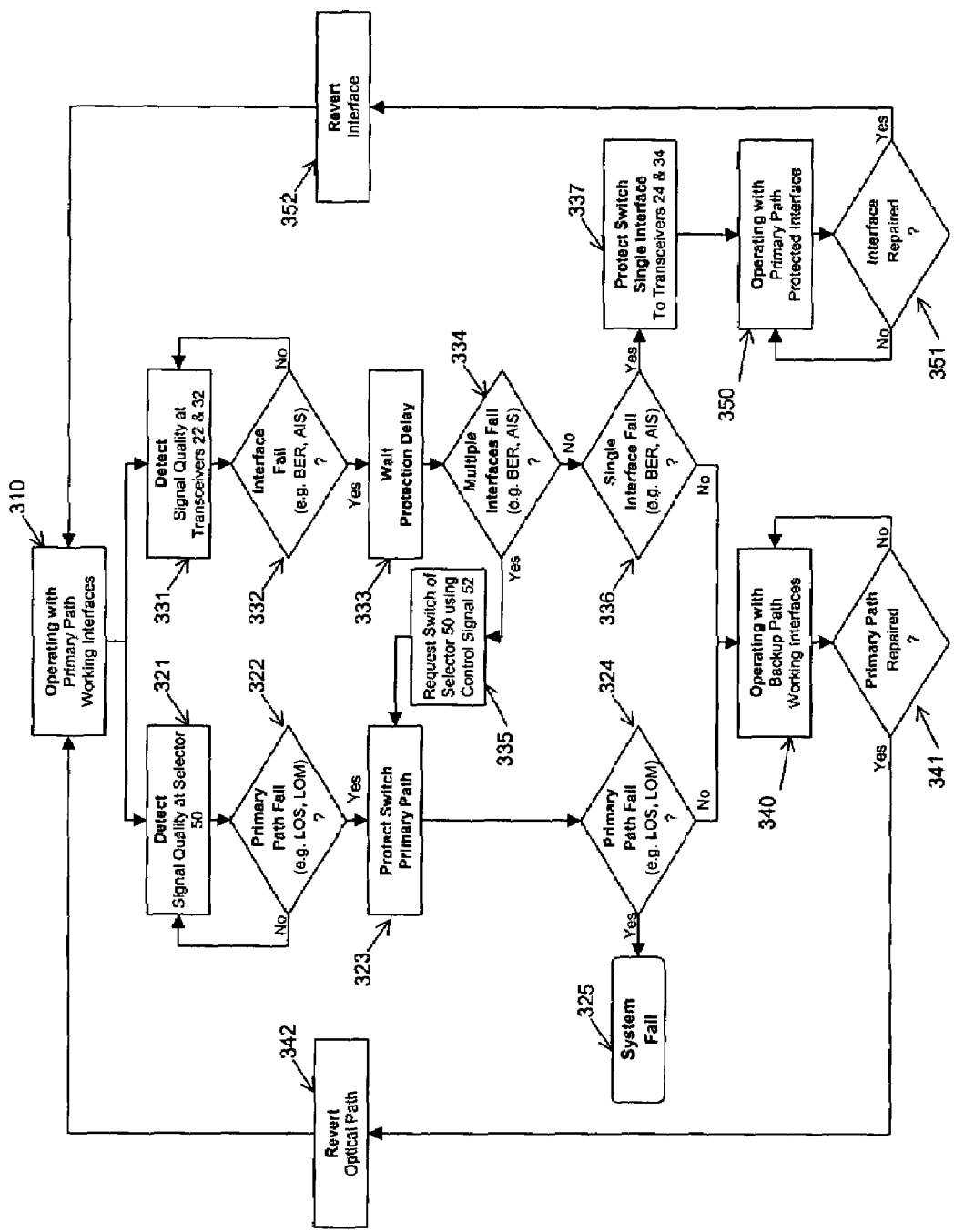
FIG. 7 is a flowchart of an exemplary process for providing tandem protection.

FIG. 7 is a flowchart of a method for providing tandem protection services for one embodiment of this communication system. The method is described with reference to FIG. 2, but may be implemented in a variety of network architecture configurations, including liner point-to-point, ring and mesh.

At step 310 the process begins. At this point, the communications system is operating under normal conditions. For example, under normal conditions, the primary communication path may be defined as diverse communication path 42 and the backup communication path may be defined as diverse communication path 44. In this step, the primary communication path 42 supports communication signals between network elements 12 and 14. Also, under normal conditions, the transceivers 22 and 32 are defined as the working interfaces and the protect transceivers 24 and 34 are unused.

The impact of signal degradation upon the primary communication path 42 will be described first followed by the impact of signal degradation upon a working interface (e.g. transceiver 22 or 32).

At step 321 signal quality on the primary communication path, for example communication path 42, is monitored. In one embodiment, the optical selector 50 monitors signal quality. The associated transceiver 32 may also detect signal quality as discussed herein.

At step 322, it is determined whether the signal quality has deteriorated. The signal deterioration may be detected as a loss of signal (LOS) or Loss of Modulation (LOM), for example, which a low cost optical selector 50 is capable of detecting. More sophisticated signal quality (bit error rate, eye pattern, SONET alarms etc.) detection may be performed by the optical selector 50 or by transceiver 32. The process loops back to step 321 if the signal quality has not been recognized as deteriorated. If signal quality deterioration is detected, the process continues to step 323.

At step 323, the optical selector 50 switches to select the backup communication path 44.

At step 324 signal quality on the backup communication path, for example communication path 44, is monitored and it is determined whether signal quality has been restored. If signal quality deterioration continues to be detected, the process moves to step 325. The process advances to step 340 if signal quality is restored to a normal state.

At step 325, it is recognized that all diverse communication paths (e.g. communication paths 42 and 44) have deteriorated and the communication system has failed.

At step 340, the communications system is operating under alternative conditions. For example, under the alternative conditions of this step, the backup communication path 44 supports communication signals between network elements 12 and 14. Also, as under normal conditions, the transceivers 22 and 32 continue as the working interfaces and the protect transceivers 24 and 34 are unused.

At step 341, an optional reversion routine may be implemented to determine when the failed primary communication path 42 is repaired. If it is determined that repair of primary communication path 42 has not occurred, the communications system will continue to operate under the alternative conditions of step 340. If it is determined that repair of primary communication path 42 has occurred and it is able to resume its role supporting communication signals between network elements 12 and 14, the process advances to step 342.

At step 342, the optical selector 50 switches to select the primary communication path 44. The communication signals between network elements 12 and 14 revert to primary communication path 44 and the communication system resumes operation under the normal conditions of step 310.

The impact of signal degradation upon a working interface (e.g. transceiver 22 or 32) is now described. At step 331 signal quality at the working interfaces, for example transceivers 22 and 32, is monitored. At step 332, it is determined whether the signal quality at the interface has deteriorated. Because signal quality is being monitored at an electrical interface, the signal deterioration may be detected using sophisticated measurements such as bit error rate, eye pattern, SONET PM or alarms (e.g. AIS). The process loops back to step 331 if the signal quality has not been recognized as deteriorated. If signal quality deterioration is detected, the process continues to step 333.

At step 333, a protection delay is initiated after the interface (e.g. transceiver 32) detects a deterioration of signal quality. The network elements 12 and 14 initiate a hold-off timer and they wait for a pre-determined time described as protection delay (e.g., 10 milliseconds) to give time for the optical selector 50 to select the best diverse communication path per steps 321, 322 and 323. Once the protection delay has expired, the process advances to step 334.

At step 334, it is determined whether the signal quality at all interfaces has been corrected or if multiple interfaces continue to be deteriorated. If it is recognized that multiple interfaces continue to be in a degraded condition, the process advances to step 335. Otherwise, the process moves to step 336.

At step 335, it is recognized that steps 321 and 322 were unable to identify signal degradation on the primary communication path because multiple signal degradations still exist after the interface protection delay (step 333). To correct the multiple signal degradations, control signal 52 is used to request that selector 50 switches from receiving signals from the primary communication path 42 to the backup communication path 44 (per step 323).

At step 336, it is determined whether the quality of a single signal continues to be deteriorated. If it is recognized that all interfaces have been corrected from the degraded condition, then the process advances to step 340. If a single signal is not restored, the process advances to step 337.

At step 337, the network elements 12 and 14 initiate the optical interface protection for the single degraded signal. In the embodiment shown, the use of SONET 1:N APS optical interface protection results in traffic being directed from a working transceiver pair 22 and 32 to protection transceiver pair 24 and 34. Using SONET signaling standards switching time is deterministic and complete connection restoration can occur within 50 milliseconds of detecting the signal deterioration. Upon completion, the process moves to step 350.

At step 350, the communications system is operating under alternative conditions. For example, under the alternative conditions of this step, the primary communication path 42 supports communication signals between network elements 12 and 14. However, a signal from one of the transceiver pairs 22 and 32 is now communicated between the protect transceivers 24 and 34.

At step 351, an optional reversion routine may be implemented to determine when the failed transceiver interface 22 or 32 is repaired. If it is determined that repair of transceiver interface 22 or 32 has not occurred, the communications system will continue to operate under the alternative conditions of step 350. If it is determined that repair of transceiver interface 22 or 32 has occurred and it is able to resume its role supporting communication signals between network elements 12 and 14, the process advances to step 352.

At step 352, the network elements 12 and 14 revert the optical interface protection switch and the communication system resumes operation under the normal conditions of step 310.

Figure 8:
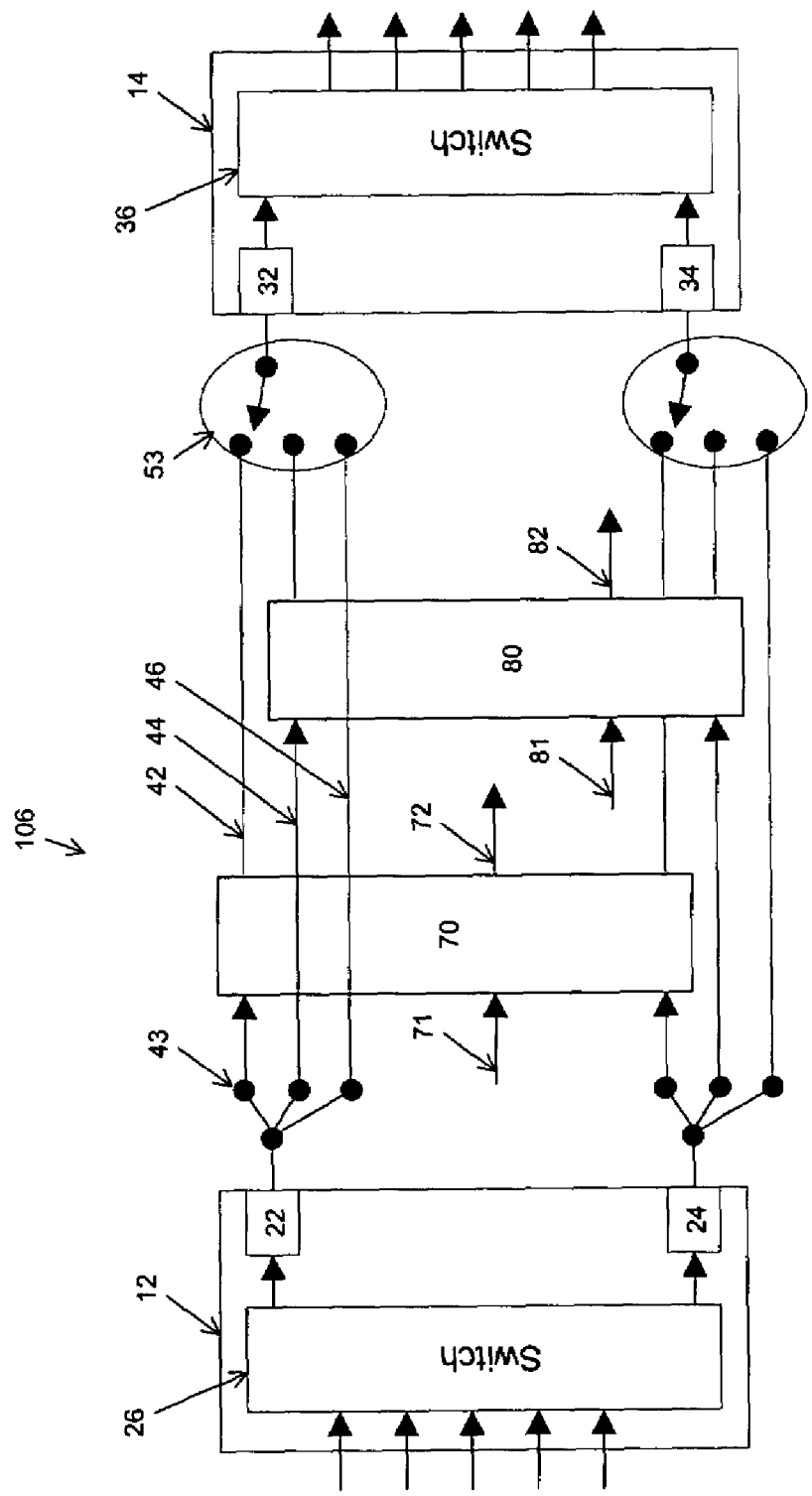
FIG. 8 is a block diagram of a communication network having a mesh architecture in an embodiment of the invention.

FIG. 8 is a block diagram of a communication system 106 in another embodiment in which the tandem optical path protection and optical interface protection are provided over a mesh communications network with more than two diverse optical paths between source and destination network elements.

For sake of illustration, this example describes optical path protection and optical interface protection for a signal transmitted from network element 12 to network element 14. During provisioning of communication paths, three diverse paths (42, 44 and 46) are established between network element 12 and network element 14. An intermediate network element 70 is provisioned to pass signals along to network element 14 using diverse communication path 42 and network element 80 is provisioned to pass signals along to network element 14 using diverse communication path 44. Diverse communication path 46 connects network element 12 to network element 14 directly.

At the output of transceivers 22 and protection transceiver 24 is a splitter 43 that divides the output into more than two diverse communication paths. This example illustrates three communication paths 42, 44 and 46. The diverse communication paths 42, 44 and 46 represent separate communication paths between the network elements. These paths may be physically isolated such as separate optical fibers geographically separated to reduce the likelihood that all paths will be disrupted simultaneously.

At the receiver side at network element 14, an optical selector 53 monitors the signal on each of the many communication paths (in this example paths 42, 44 and 46) and selects the diverse communication path having the better signal quality. The optical selector may be a simple, low cost device that monitors the first communication path 42 and switches to the second communication path 44 or third communication path 46 in the event of a loss of signal (LOS) or Loss of Modulation (LOM). The redundant diverse communication paths 42, 44 and 46 and the optical selector 50 provide optical path protection.

For the purpose of this example, network element 70 is defined to terminate the optical signal using an optical to optical (OO) interface. It receives the signal optically and re-transmits an optical signal towards network element 14 without electrical conversion. An example of such a network element may be an optical line amplifier (e.g. Erbium Doped Fiber Amplifier) or an all-optical switch. If WDM transmission is used then network element 70 may be an Optical Add Drop Multiplexer or a Wavelength Selective Optical Switch. In a mesh network, network element 70 may terminate more than two optical paths. Optical paths 71 and 72 represent alternative optical paths in this mesh network scenario.

For the purpose of this example, network element 80 is defined to terminate the optical signal using an optical to electronic to optical (OEO) interface. It receives the signal optically, converts the optical signal to an electronic signal and re-transmits a regenerated optical signal towards network element 14. An example of such a network element may be a SONET regenerator (e.g. Section Terminating Equipment or Line Terminating Equipment). In a mesh network, network element 80 may terminate more than two optical paths. Optical paths 81 and 82 represent alternative optical paths in this mesh network scenario.

In the mesh embodiment, new communication paths may be provisioned when signal deterioration is detected on an existing communication path. For example, if comunication path 42 experiences signal degradation, selector 53 swtiches to communcation path 44. Another communication path may be provisioned to provide an optical protection path for the newly selected communcation path.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A communication system providing tandem protection comprising:
    a first network element having a first transceiver and a first protection transceiver;
    a second network element having a second transceiver and a second protection transceiver;
    a first communication path coupling the first network element to the second network element;
    a second communication path coupling the first network element to the second network element;
    a splitter for splitting a signal to each of said first communication path and said second communication path for transmission to said second network element;
    a selector for selecting one of said first communication path and said second communication path for reception at said second network element;
    said first network element initiating communication between said first protection transceiver and said second protection transceiver upon signal deterioration on said first communication path in combination with signal deterioration on said second communication path.

2. The communication system of claim 1 wherein:
    said signal deterioration is loss of signal detected by said selector.

3. The communication system of claim 1 wherein:
    said signal deterioration is loss of modulation detected by said selector.

4. The communication system of claim 1 wherein:
    said signal deterioration is detected by said second transceiver, said second transceiver generating control signal;
    said selector selecting one of said first communication path and said second communication path in response to said control signal.

5. The communication system of claim 1 wherein:
    said first communication path and said second communication path are WDM paths each carrying a plurality of WDM channels;
    said selector selecting one of said first communication path and said second communication path in response to one WDM channel.

6. The communication system of claim 1 wherein:
    said first communication path and said second communication path are WDM paths each carrying a plurality of WDM channels;
    said selector selecting one of said first communication path and said second communication path in response to said plurality of WDM channels.

7. The communication system of claim 1 wherein:
    said selector includes a first selector and a second selector;

said first selector selecting said first communication path; and said second selector selecting said second communication path.

8. The communication system of claim 1 further comprising:

a first intermediate network in said first communication path, said first intermediate network passing signals from said first network element to said second network element;

a second intermediate network in said second communication path, said second intermediate network passing signals from said first network element to said second network element.

9. The communication system of claim 1 wherein:

upon signal deterioration on said first communication path, said first network element initiating communication between said first protection transceiver and said second protection transceiver is delayed by a hold off time until signal deterioration on said second communication path is detected.

10. The communication system of claim 1 wherein:

said selector selects said second communication path upon signal deterioration on said first communication path;

said selector reverting to select said first communication path upon restoration of said first communication path.

11. The communication system of claim 1 wherein:

said first network element and said second network element are in a mesh configuration;

said first network element provisioning a third communication path coupling said first network element to said second network element upon signal deterioration on said first communication path or said second communication path.

12. A method for providing tandem protection in a communication system, the method comprising:

transmitting a signal on a first communication path and a second communication path;

selecting one of said first communication path and said second communication path for reception of said signal;

initiating communication of said signal on a protection path upon detecting signal deterioration on said first communication path in combination with detecting signal deterioration on said second communication path.

13. The method of claim 12 wherein:

said signal deterioration is loss of signal.

14. The method of claim 12 wherein:

said signal deterioration is loss of modulation.

15. The method of claim 12 wherein:

said first communication path and said second communication path are WDM paths each carrying a plurality of WDM channels;

said selecting one of said first communication path and said second communication path being in response to one WDM channel.

16. The method of claim 12 wherein:

said first communication path and said second communication path are WDM paths each carrying a plurality of WDM channels;

said selecting one of said first communication path and said second communication path being in response to a plurality of WDM channels.

17. The method of claim 12 wherein:

upon signal deterioration on said first communication path, initiating communication on said protection path is delayed by a hold off time until signal deterioration on said second communication path is detected.

18. The method of claim 12 further comprising:

selecting said second communication path upon signal deterioration on said first communication path;

reverting to said first communication path upon restoration of said first communication path.

19. The method of claim 12 further comprising:

provisioning a third communcation path upon signal deterioration on said first communication path or said second communication path.

* * * * *